J. A. HAGERSTROM.
LINE SPACING MECHANISM.
APPLICATION FILED AUG. 18, 1917.
1,359,501.
Patented Nov. 23, 1920.
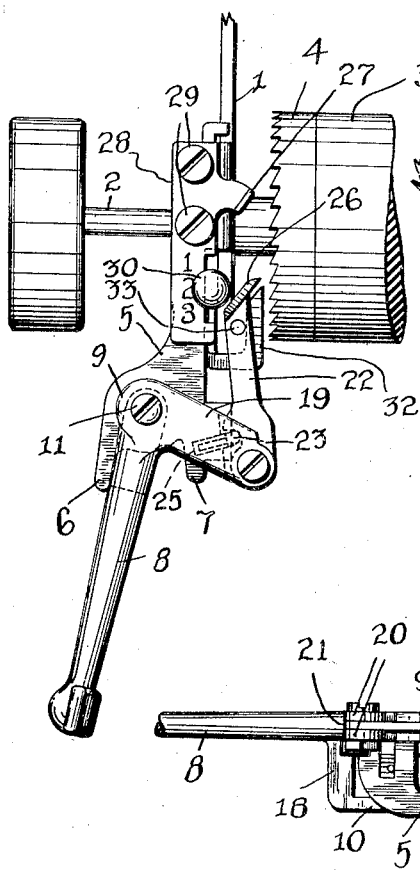
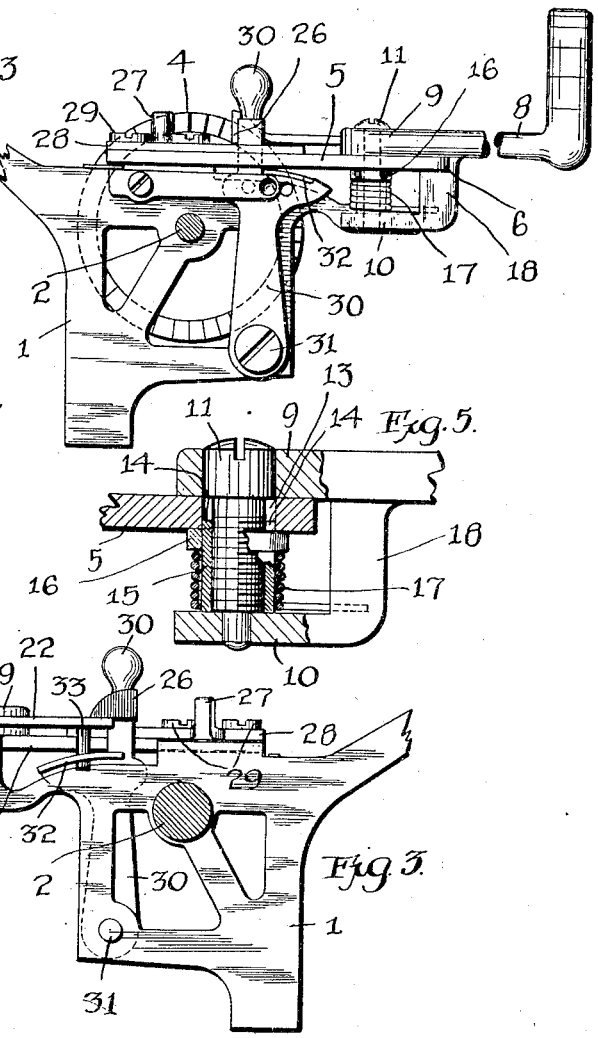
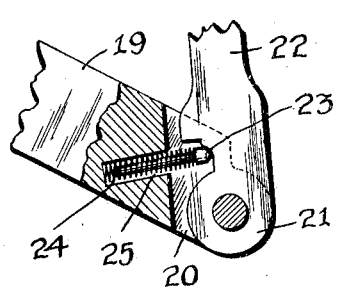
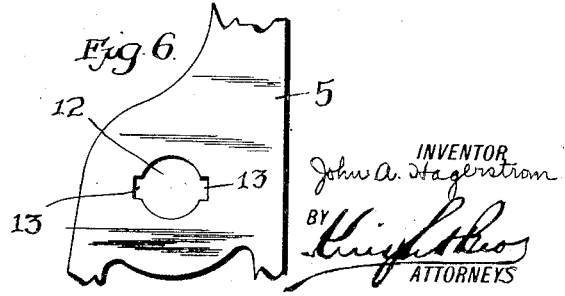
INVENTOR
John A. Hagerstrom
BY
ATTORNEYS

UNITED STATES PATENT OFFICE.

JOHN A. HAGERSTROM, OF SCRANTON, PENNSYLVANIA, ASSIGNOR TO VICTOR TYPEWRITER COMPANY, OF SCRANTON, PENNSYLVANIA, A CORPORATION OF NEW YORK.

LINE-SPACING MECHANISM.

1,359,501.   Specification of Letters Patent.   Patented Nov. 23, 1920.

Application filed August 18, 1917. Serial No. 186,898.

*To all whom it may concern:*

Be it known that I, JOHN A. HAGERSTROM, a citizen of the United States, and resident of Scranton, in the county of Lackawanna and State of Pennsylvania, have invented certain new and useful Improvements in Line-Spacing Mechanism, of which the following is a specification.

This invention relates to line spacing mechanisms for typewriter and has for its primary object to provide an improved construction, combination and arrangement of parts in a device of this character with a view to improving its action and general serviceability, simplifying its structure, and reducing its cost of manufacture. Other and more specific objects of invention will appear in the specification and be pointed out in the appended claims. The preferred embodiment of my invention is shown on the drawings in which—

Figure 1 is a top plan view of my line-spacing mechanism, showing fragmentary parts of platen and carriage contiguous thereto;

Fig. 2 is a side elevation of the same, the platen shaft being shown in section;

Fig. 3 is a side elevation from the other side, the platen shaft being shown in section;

Fig. 4 is a fragmentary detail on an enlarged scale, parts being broken away and parts shown in section;

Fig. 5 is a fragmentary section of the line space lever and mount therefor;

Fig. 6 is a fragmentary top plan view of the line space lever bracket or support.

Referring more particularly to the drawings, the carriage frame 1 has journaled thereon the platen spindle 2 which carries the platen 3 provided with ratchet 4 for the line spacing movements. A horizontal plate or bar 5 is rigid with the carriage frame 1 and is bifurcated horizontally at its forward end to form a back stop 6, and a forward stop 7 for a line space lever 8, which is bifurcated at one end to form an upper bearing lug 9 and a lower bearing lug 10, said bearing lugs being journaled on opposite ends of a screw 11. The upper bearing lug 9 of the line space lever 8 rests upon the bracket 5, said bracket being provided with an opening 12 for accommodating the screw 11. Said bracket is recessed at 13, 13 to adapt it to interlock with nibs 14, 14, on the upper end of a thimble 15 into which the screw 11 is threaded. Interposed between the lower bearing lug 10 and a collar 16, is a spring 17 which serves to pinch the bracket 5 between the head of screw 11 and the collar 16. The lower bearing lug 10 of the line space lever is carried by an arm 18 which is normally held against the back stop 6 by the spring 17. The operating movement of said line-space lever in an anti-clockwise direction is limited by the front stop 7. The line space lever is provided with a laterally projecting arm 19 which is slotted at its outer extremity to provide spaced bearing lugs 20 between which is disposed the hub end 21 of a pawl 22, said pawl being cut away adjacent its hub portion to provide a suitable seat for the enlarged end of a pin or bolt 23 which is acted upon by a spring 24 seated in a recess 25 formed in the arm 19. The free end of the pawl 22 is provided with an inclined abutment or plate 26 which is adapted to be operated upon by a fixed plate or abutment 27 carried by a plate 28 which is secured to the frame by means of screws 29. The forward end of plate 28 is provided with the numerals 1, 2 and 3, to indicate the several positions which may be assumed by the line space control lever 30 which is pivoted on a stud 31 and carries a guard or a guide bar 32 for slidably engaging a pin 33 carried by the pawl 22. It will be understood from this description that the angular movement of the line space lever 8 is constant in its extent, being limited by the angular space between the stops 6 and 7. At the same time, the fixed stop 27 is arranged at an angle to the platen axis so as to coöperate with the abutment or plate 26 for interlocking with the ratchet 4 at the end of the line space movement and thereby preventing an overthrow of the platen. It will also appear that depending upon the position of the control lever 30, the guide or guard 32 releases the pawl 17 at different stages of its movement, so that it is thus adapted to displace the platen 3 through 1, 2 or 3 spaces, according to the time of its release from the guide bar 32.

I claim:

1. In a typewriter, a carriage provided with an end frame, a rotary platen journaled at one end in said end frame, a ratchet carried by said platen, a fixed abutment mounted on said end frame, a line space lever pivoted on said end frame to swing in a plane parallel to the axis of said platen, a pawl pivotally connected to said line space lever and provided with an abutment adapted to be brought into engagement with said fixed abutment, said pawl being movable endwise along the teeth of said ratchet, a line space control lever pivotally mounted on said end frame to swing in a plane substantially transverse to the axis of said platen, a guide bar carried by said line space lever and extending transversely to said platen axis, and means interengaging between said guide bar and said pawl for controlling the movement of said pawl into and out of engagement with said ratchet.

2. In a typewriter, a carriage provided with an end frame, a rotary platen journaled at one end in said end frame, a ratchet carried by said platen, a fixed abutment mounted on said end frame, a line space lever pivoted on said end frame to swing in a plane parallel to the axis of said platen, a pawl pivotally connected to said line space lever and provided with an abutment adapted to be brought into engagement with said fixed abutment, said pawl being movable endwise along the teeth of said ratchet, a line space control lever pivotally mounted on said end frame to swing in a plane substantially transverse to the axis of said platen, a guide bar carried by said line space lever and extending transversely to said platen axis, and means interengaging between said guide bar and said pawl for controlling the movement of said pawl into and out of engagement with said ratchet, said abutments being provided with contact bearing surfaces inclined toward the plane of said ratchet for locking said pawl in engagement with the ratchet at the end of the line space movement.

3. In a typewriter, a fixed support, a line space lever provided with spaced bearing lugs on opposite sides of said support, a stud passing through said bearing lugs and bracket, said line space lever having its bearing lugs journaled on said stud, a thimble threaded to said stud and interposed between said support and one of said bearing lugs, and a spring extending around said thimble and exerting a yieldable pressure against said support.

JOHN A. HAGERSTROM.

Witnesses:
MARY C. ROCHE,
H. B. MONINGER.